Patented May 30, 1950

2,509,927

UNITED STATES PATENT OFFICE 2,509,927

PROCESS OF RETARDING STIFFENING OF BREAD

Norman F. Johnston, East Norwalk, Conn.; dedicated to the People of the United States of America, by R. T. Vanderbilt Co., Inc., New York, N. Y., a corporation of New York, assignee No Drawing. Application August 14, 1948, Serial No. 44,407

8 Claims. (Cl. 99—91)

My invention relates to improvements in the preparation of starch-containing yeast-raised bakery products.

My invention is particularly useful in modifying the starch of yeast-raised bakery products such as bread, rolls, and sweet doughs so that these foods will become stale less rapidly. Staleness in bread is accompanied by a number of changes. Thus, the loaf becomes progressively firmer, the crumb feels firmer, drier, and more friable, and the flavor gradually changes. If a stale loaf of bread is warmed in the oven most of the characteristics lost in aging are regained. The loaf and crumb become soft and remain soft even after cooling. The crumb feels moist and is no longer friable, and the tendency to crumble has been lost. The flavor that was missing in the stale bread becomes evident again and for all practical purposes the bread thus warmed is fresh.

It is evident from this that the bread has not become stale because it has dried out by losing moisture, for no moisture was added during the warming of the bread in the oven. The desirable flavors of fresh bread were not volatilized and lost during the aging of the bread since they again become evident after warming. It may be that the wheat starch has lost some of its water of gelatinization to the surrounding surfaces and heating of the bread serves to return this unbound water into the starch, thereby imparting softness and the sensation of moistness to the bread and releasing the flavors characteristic of fresh bread in such a way that they can be detected in the mouth.

Although the mechanism of staling and heating freshening is not understood, results similar to those obtained by heating freshening can be obtained in accordance with the method of the present invention by simply adding to the dough during the preparation of the bakery product a small amount of a polyoxyethylene monoester of a higher fatty acid such as oleic, stearic, or palmitic acid.

Yeast-raised bakery products prepared according to the invention retain their freshness and softness for several days longer. This effect is quite different from that obtained by adding shortening to bread. When shortening or lard is used in amounts up to 2% of the weight of flour there is a noticeable softening of the bread, but larger amounts of shortening have no appreciable effect in retarding the hardening or staling of bread whereas the addition of a polyoxyethylene monoester of a higher fatty acid to the 2% of shortening strikingly improves the retarding of the hardening and staling of bread. This effect appears to be independent of the amount of shortening in the bread formula.

The following examples of the invention will further illustrate specific embodiments of my invention:

EXAMPLE I

This example illustrates the manufacture of white pan bread according to the invention.

FORMULA

| Sponge | Dough |
|---|---|
| 60 lbs. hard wheat flour<br>36 lbs. water<br>2 lbs. yeast<br>¼ lb. yeast food | 40 lbs. hard wheat flour<br>25 lbs. water<br>2 lbs. salt<br>3 lbs. sugar<br>1 lb. malt syrup<br>4 lbs. dry milk<br>2 lbs. shortening<br>¼ lb. 8-polyoxyethylene stearate |

PROCEDURE

*Sponge*

Dissolve the yeast in a portion of the water (72° F.) and add to mixer along with flour, yeast food and the balance of the water. Mix just enough to make a homogeneous mass, dump into a trough and ferment for 5½ hours at 72° F.

*Dough*

Return fermented sponge to mixer, add all the dough ingredients, including the polyoxyethylene stearate, and mix until smooth. Allow to stand about 15 minutes, divide, round, and allow to stand again, mold, pan, proof at 95° F. to top of pans and bake at 420° F. until uniformly brown, about 30 minutes with steam in oven. Cool slowly to room temperature and wrap in moisture-proof paper.

EXAMPLE II

This example illustrates the invention as applied to the production of sweet yeast-raised dough for coffee cake, tea rings and the like.

FORMULA

| | Pounds |
|---|---|
| Bread flour | 76.5 |
| Pastry flour | 23.5 |
| Milk | 47 |
| Yeast | 6 |
| Sugar | 12 |
| Malt syrup | 3 |
| Salt | 1 |
| Shortening | 15 |
| Eggs | 9 |
| Flavoring, to suit | |
| 8-polyoxyethylene stearate | 1 |

PROCEDURE

Cream the malt, sugar, salt, and shortening. Add the eggs gradually and cream until light. Add the flavoring and polyoxyethylene stearate. Dissolve the yeast in a quarter of the milk. Place the balance of the milk in the bowl with the creamed mass and stir well to dissolve the ingredients. Add the bread flour and start mixing. Pour in the yeast solution, add the pastry flour and continue mixing until smooth. Have the dough at 80° F. when mixed. Allow dough to rise to full punch, then take to bench in 15 minutes. Scale, make up into desired shapes, proof to double their size and bake.

EXAMPLE III

This example illustrates the invention as applied to the production of buns or rolls such as are used for "hamburgers" and "hot dogs."

FORMULA

| | | |
|---|---|---|
| Bread flour | pounds | 8½ |
| Water | quarts | 2 |
| Yeast | ounces | 2 |
| Salt | do | 1¾ |
| Sugar | do | 5 |
| Milk powder | do | 5 |
| Shortening | do | 8 |
| 10-polyoxyethylene stearate | do | 1½ |

PROCEDURE

Dissolve yeast in some of the water, then place in mixer with all the other ingredients. Mix until smooth and well developed. Dough should be 78° F. when taken from mixer. Ferment approximately as follows:

First rise 1¾ hours, second rise 45 minutes and then work off in another 15 minutes. If scaled at 18 g. per dozen, this batch makes approximately 12 dozen rolls.

Of course, dry mixes of the yeast-raising products containing the anti-staling agent may be prepared to which the baker or housewife will add the necessary water.

The anti-staling agents employed in practicing my invention are the reaction products of ethylene oxide or polyethylene glycol with a higher fatty acid such as stearic, oleic or palmitic acid. The molar ratio of ethylene oxide or ethylene glycol to fatty acid in general must be between 6:1 and 16:1. For convenience in nomenclature a numeral indicating the proportion of ethylene oxide radicals within the molecule is employed as a prefix, e. g., 8-polyoxethylene monostearate.

In general, amounts of monoester ranging from about 0.1% to about 3.5% of the weight of the flour are useful, depending on the particular yeast-raised product as well as the degree of softness desired, with the sweet doughs requiring the higher amounts of monoester.

I do not understand the mechanism whereby the incorporation of the polyoxyethylene monoester into the dough makes possible the preparation of a baking product of improved properties. Thus, although superglycerinated fat has heretofore been incorporated into dough to tenderize bread and both superglycerinated fat and the monoesters employed in accordance with the present invention are nonionic surface-active materials, the great majority of such materials do not retard the staling of bread.

Furthermore, I believe that the mechanism whereby the effect of incorporating superglycerinated fat into bread is produced differs from the mechanism whereby the effect is produced when the present invention is practiced. This difference is suggested by the different effects produced in wheat starch (a major ingredient of bread) pastes by superglycerinated fat and the polyoxyethylene monoesters.

Two manifestations of the effects of the monoesters used in this invention on starch pastes can be shown by viscosity measurements. These effects are compared in the tables below with those obtained with superglycerinated fat, which is not a good modifying agent for starch pastes.

| Surface-Active Agent | Per cent Reduction in Firmness of a 7% Wheat Starch Paste Containing 2% S. A. A. Based on the Weight of Starch |
|---|---|
| 8-oxyethylene stearate | 59 |
| Superglycerinated fat | 34 |

In obtaining the data of the preceding table, the starch and surface-active agent were added to water in the proper proportions, and the mixture was gelatinized by heating to 100° C. at a rate of 1.5° C. per minute with stirring. The mixture was allowed to stand at room temperature for 24 hours, after which the viscosity of the mixture was measured. A similar mixture containing no surface active agent was similarly treated, and the per cent reductions of the table were computed using the viscosity of the mixture containing no surface-active agent as a standard.

Also, when mixtures of 75 gm. of wheat starch, 1.5 gm. of ester, and 250 ml. of water is heated at a uniform rate of 1.5° C. per minute, the mixtures reach the same stage of gelation, as determined by viscosity measurements, at the following temperatures:

| Ester | Temp., ° C. |
|---|---|
| None | 62.5 |
| 8-oxyethylene stearate | 69.5 |
| 10-oxyethylene stearate | 70 |
| Superglycerinated fat | 62.5 |

This application is a continuation-in-part of my copending applications Serial Nos. 731,049 now abandoned and 745,738 filed February 26, 1947, and May 3, 1947, respectively.

I claim:

1. In the preparation of starch-containing, yeast-raised bakery products, the improvement which comprises incorporating a polyoxyethylene monoester of a higher fatty acid in the dry mix in an amount approximating 0.1 to 3.5 per cent by weight of the flour where the ester contains a molar ratio of ethylene oxide radicals to fatty acid in the range of 6:1 to 16:1.

2. In the preparation of starch-containing yeast-raised bakery products, the improvement which comprises incorporating a polyoxyethylene monoester of a higer fatty acid in the dough in an amount approximating 0.1 to 3.5 per cent by weight of the flour where the ester contains a molar ratio of ethylene oxide radicals to fatty acid in the range of 6:1 to 16:1.

3. The method of claim 2 in which the higher fatty acid is stearic acid.

4. The method of claim 2 in which the monoester is 8-polyoxyethylene stearate.

5. In the preparation of starch-containing yeast-bakery products, the improvement which comprises incorporating a polyoxyethylene monoester of palmitic acid in the dough in an amount approximating 0.1 to 3.5 per cent by weight of the flour where the ester contains a molar ratio of ethylene oxide radicals to fatty acid in the range of 6:1 to 16:1.

6. The method of claim 5 in which the monoester is 8-polyoxyethylene palmitate.

7. In the preparation of starch-containing yeast-bakery products, the improvement which comprises incorporating a polyoxyethylene monoester of oleic acid in the dough in an amount approximating 0.1 to 3.5 per cent by weight of the flour where the ester contains a molar ratio of ethylene oxide radicals to fatty acid in the range of 6:1 to 16:1.

8. The method of claim 7 in which the monoester is 8-polyoxyethylene oleate.

NORMAN F. JOHNSTON.

REFERENCES CITED

The following references are of record in the file of this patent:

UNITED STATES PATENTS

| Number | Name | Date |
|---|---|---|
| 2,132,436 | Reynolds | Oct. 11, 1938 |
| 2,132,700 | Richardson | Oct. 11, 1938 |
| 2,422,486 | Johnson | June 17, 1947 |

OTHER REFERENCES

Atlas Spans and Tweens, Indus. Chem. Dept., Atlas Powder Co., June 1945, pages 1, 2, 11 and 12.

Special Report No. 15, The Staling and Keeping Quality of Bread, Research Association of British Flour Millers, 40 Trinity Sq., London, November 1936, pages 26, 27.